United States Patent
Amarnath et al.

(10) Patent No.: US 10,127,488 B2
(45) Date of Patent: Nov. 13, 2018

(54) SYSTEMS AND METHODS FOR CREATING DYNAMIC PROGRAMMABLE MAGNETIC STRIPES

(71) Applicant: Qvivr, Inc., Fremont, CA (US)

(72) Inventors: Kuldeep Amarnath, Santa Clara, CA (US); Ashutosh Dhodapkar, Santa Clara, CA (US)

(73) Assignee: QVIVR, INC., Santa Clara, CA (US)

(*) Notice: Subject to any disclaimer, the term of this patent is extended or adjusted under 35 U.S.C. 154(b) by 0 days.

(21) Appl. No.: 14/922,771

(22) Filed: Oct. 26, 2015

(65) Prior Publication Data

US 2016/0188916 A1 Jun. 30, 2016

Related U.S. Application Data

(60) Provisional application No. 62/098,227, filed on Dec. 30, 2014.

(51) Int. Cl.
*G06K 7/08* (2006.01)
*G06K 19/077* (2006.01)
*G06K 19/06* (2006.01)

(52) U.S. Cl.
CPC ....... *G06K 19/07722* (2013.01); *G06K 7/087* (2013.01); *G06K 19/06206* (2013.01); *G06K 19/07745* (2013.01)

(58) Field of Classification Search
CPC ............ G06K 7/08; G06K 5/00; G06K 19/06; G06K 19/00; G06K 7/06; G06F 17/00
USPC ................ 235/449, 380, 492, 487, 375, 441
See application file for complete search history.

(56) References Cited

U.S. PATENT DOCUMENTS

| | | | |
|---|---|---|---|
| 8,382,000 B2 * | 2/2013 | Mullen | G06K 19/06206 235/449 |
| 8,579,203 B1 * | 11/2013 | Lambeth | G06Q 20/3415 235/380 |
| 2007/0241201 A1 * | 10/2007 | Brown | G06Q 20/26 235/493 |
| 2010/0265037 A1 * | 10/2010 | Domsten | G06Q 20/341 340/5.82 |
| 2011/0174874 A1 * | 7/2011 | Poznansky | G06K 19/12 235/379 |
| 2014/0117094 A1 * | 5/2014 | Workley | G06K 7/084 235/492 |
| 2015/0073983 A1 * | 3/2015 | Bartenstein | G06Q 20/3415 705/41 |

* cited by examiner

*Primary Examiner* — Edwyn Labaze
(74) *Attorney, Agent, or Firm* — IPR Law Group PC

(57) ABSTRACT

Conventional magnetic stripe cards are encoded with static magnetic patterns. To act like many different magnetic stripe cards, a programmable dynamic magnetic stripe card disclosed. The programmable dynamic magnetic stripe card includes a solenoid coil for generating a magnetic field and solenoid coil driver circuitry for driving the solenoid coil to generate a magnetic field. To improve the quality of the magnetic field generated, a biasing magnet is placed adjacent to the solenoid coil.

20 Claims, 16 Drawing Sheets

SYSTEMS AND METHODS FOR CREATING DYNAMIC PROGRAMMABLE MAGNETIC STRIPES

RELATED APPLICATIONS

The present application claims the benefit of the earlier filed U.S. Provisional Patent application titled "Dynamic, Programmable Magnetic Stripes" with Ser. No. 62/098,227 filed on Dec. 30, 2014.

TECHNICAL FIELD

The present invention relates to the field of magnetic data storage systems. In particular, but not by way of limitation, the present invention discloses techniques for implementing dynamic programmable magnetic stripes.

BACKGROUND

Magnetic stripes are very often used for storing information that can be quickly read back when necessary. Specifically, small plastic cards are often used to carry magnetic data stripes that can be encoded with a small amount of information which can quickly be read back with corresponding a magnetic card reader.

Magnetic data stripes have become so popular that many people now carry around a large multitude of plastic cards with magnetic data stripes. For example, a person may carry several credit cards, ATM cards, debit cards, a driver's license, library cards, retailer loyalty cards, electric car charging cards, security access cards, and other plastic cards with magnetic stripes.

The rapid growth in the use of plastic cards with magnetic stripes in recent years can make things difficult to manage for people that have many plastic cards with magnetic stripes. For example, a wallet storing many plastic cards with magnetic stripes can become quite thick and unwieldly. If a person keeps their wallet in their back pocket, sitting a thick wallet filled with plastic cards with magnetic stripes may eventually cause back problems. Furthermore, when a person needs to use a plastic card with a magnetic stripe that person may have to take the time to shuffle through a large stack of plastic cards with magnetic stripes in order to find the proper plastic card with a magnetic stripe for the current situation. Due to these problems associated with the growth in usage of plastic cards with magnetic stripes, it would therefore be desirable to implement systems and methods that reduce these problems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some example embodiments are disclosed with reference to credit cards with magnetic stripes, the teachings of this disclosure may be used to provide magnetic stripes for any other purpose. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
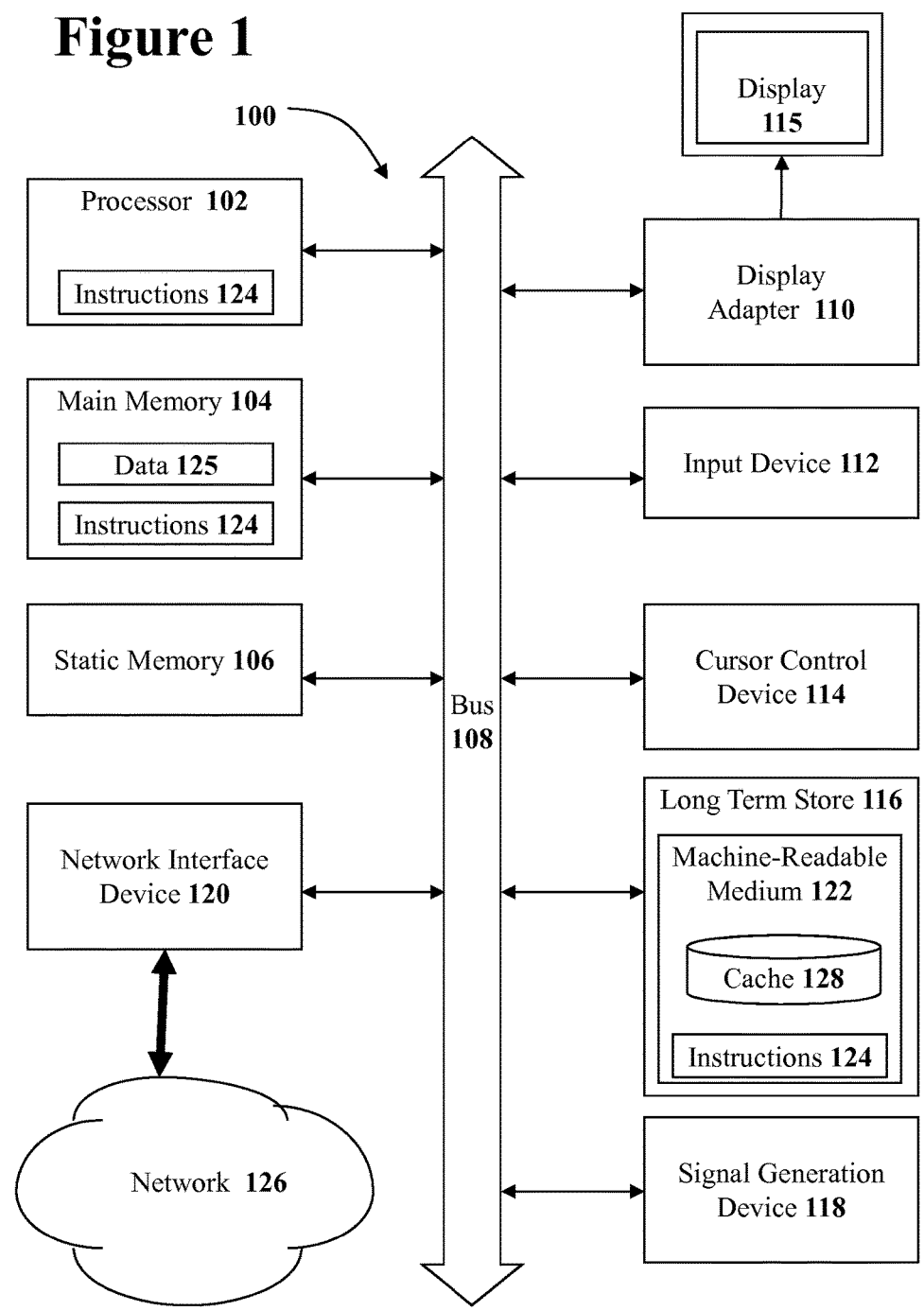
FIG. 1 illustrates a diagrammatic representation of a machine in the example form of a computer system within which a set of instructions, for causing the machine to perform any one or more of the methodologies discussed herein, may be executed.

Some embodiments of the present disclosure may use computer systems since computer systems are very often used in conjunction with magnetic stripe systems. FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a small card, personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a display adapter 110 that drives a display system 115 such as a Liquid Crystal Display (LCD), Cathode Ray Tube (CRT), or other suitable display system. The computer system 100 may also include an input device 112 (e.g., a keyboard), a cursor control device 114 (e.g., a trackpad, mouse, or trackball), a long term storage unit 116, an output signal generation device 118, and a network interface device 120.

The long term storage unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media. Note that the example computer system 100 illustrates only one possible example and that other computers may not have all of the components illustrated in FIG. 1 or may have additional components as needed.

The instructions 124 may further be transmitted or received over a computer network 126 via the network interface device 120. Such transmissions may occur utilizing any one of a number of well-known transfer protocols such as the File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, flash memory, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

In the present disclosure, a computer system may comprise a very small microcontroller system. A microcontroller may comprise a single integrated circuit that contains the four main components that create a computer system: an arithmetic and logic unit (ALU), a control unit, a memory system, and an input and output system (collectively termed I/O). Microcontrollers are very small and inexpensive integrated circuits that are very often used within digital electronic devices. A microcontroller may be integrated along with other functions to create a system on a chip (SOC).

Magnetic Stripe Cards Overview

Figure 2:
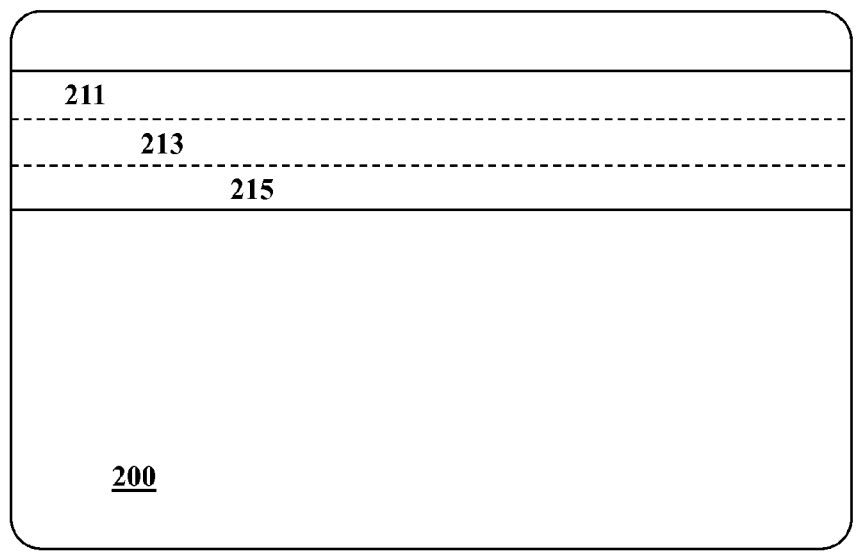
FIG. 2 illustrates a conventional three track magnetic stripe card.

A magnetic stripe card is a physical card typically made of hard plastic or another suitable material that contains a band or stripe of magnetic material. The magnetic stripe is typically contained in a plastic-like film for protection. Conventionally, the magnetic stripe is located 0.223 inches (5.66 mm) from the upper edge of the physical card. A conventional magnetic stripe on a conventional magnetic stripe card 200 contains three distinct magnetic tracks 211, 213, and 215 as illustrated in FIG. 2. Each of these magnetic tracks is 0.110 inches (2.79 mm) wide.

Digital data such as an identifier can be magnetically encoded on the magnetic tracks 211, 213, and 215 of the magnetic stripe area. The encoded information can subsequently be read by swiping the magnetic stripe past a magnetic sensor or read-head. Magnetic stripe cards are commonly used as gift cards, prepaid cards, other types of stored value cards, credit cards, debit cards, employee ID cards, etc.

With conventional magnetic stripe cards, the magnetic stripe card issuer encodes specific information onto the magnetic stripe card before the magnetic stripe card is issued to a magnetic stripe card user. Thereafter, when the magnetic stripe card user swipes the magnetic stripe card on an appropriate magnetic stripe card reader, the magnetic stripe card reader will obtain the information encoded onto the card and use that information for some type of transaction. For example, a magnetic stripe card user may swipe at magnetic stripe card at a point of sale terminal to purchase an item.

The information encoded onto a magnetic stripe card is generally in the form of a static identifier such as a card identification number, an account number, a credit card number, an employee identifier, etc. So-called stored value cards (e.g., gift cards, prepaid cards) can be associated with a value (e.g., $10, $50, $200) which can be spent at a given merchant (e.g., Target, Starbuck's, Amazon, etc.). Other payment cards such as prepaid debit cards store a value which can be spent at any merchant which takes the card type (e.g., Visa). With non-pre-paid debit cards, the associated value is typically the amount in an associated bank account, whereas with credit cards the value is the associated line of credit (i.e., the amount remaining on the credit limit).

In all of these cases, when a card is presented at a merchant, the static identifier data stored on the card (e.g., the account number, the credit card number, etc.) is used to lookup an associated value, from which the amount of the transaction is deducted. This value is not stored on the card itself, but instead on a computer system accessible from the point of sale over a network. In a similar way, value can be added to a conventional card (e.g., the card holder presents physical currency to a retail merchant and asks to have the value added to an existing card, deposits money in a bank account, makes a payment on a credit card, etc.). In any case, the dynamic value associated with the card is stored by a computer system such that the static identifier information on the card can be used to access the dynamic off-card information.

Magnetic Stripe Cards Shortcomings

With conventional physical magnetic stripe cards, each magnetic stripe card is statically associated with a single merchant, financial institution or payment network. Thus, users of magnetic stripe cards often end up carrying a large number of magnetic stripe cards or finding themselves without a specific magnetic stripe card needed for use when at a particular store. Furthermore, when using a magnetic stripe card, the magnetic stripe card user may have to search through a large collection of magnetic stripe cards to find the specific magnetic stripe card associated with a specific merchant, financial institution or payment network. Similarly, to add value to one's own magnetic stripe cards or those of others as a gift, consumers must separately add value to each specific magnetic stripe card associated with each individual target context.

Dynamic Magnetic Stripe Cards

Conventional magnetic stripe cards use magnetic media to store the static information. The information to be stored onto the magnetic stripe card is translated to a binary format and the binary ones and zeros are encoded in the orientation of magnetic dipoles onto the magnetic media on the magnetic stripe card. To read the digitally stored information off the magnetic stripe card, the magnetic stripe card is swiped across a magnetic card reader with an appropriate read-head. The read-head senses the changes in the orientation of the magnetic dipoles during a swipe across the read-head. The change in the magnetic dipole orientations manifests as a magnetic flux reversal in a coil present in the read-head. These magnetic flux reversals in the coil induce a small electrical current that results in the generation of a potential difference between the ends of the coil in synchronization with the magnetic flux changes. The potential difference between the ends of the coil is amplified and demodulated to extract the underlying encoded digital information.

Figure 3:
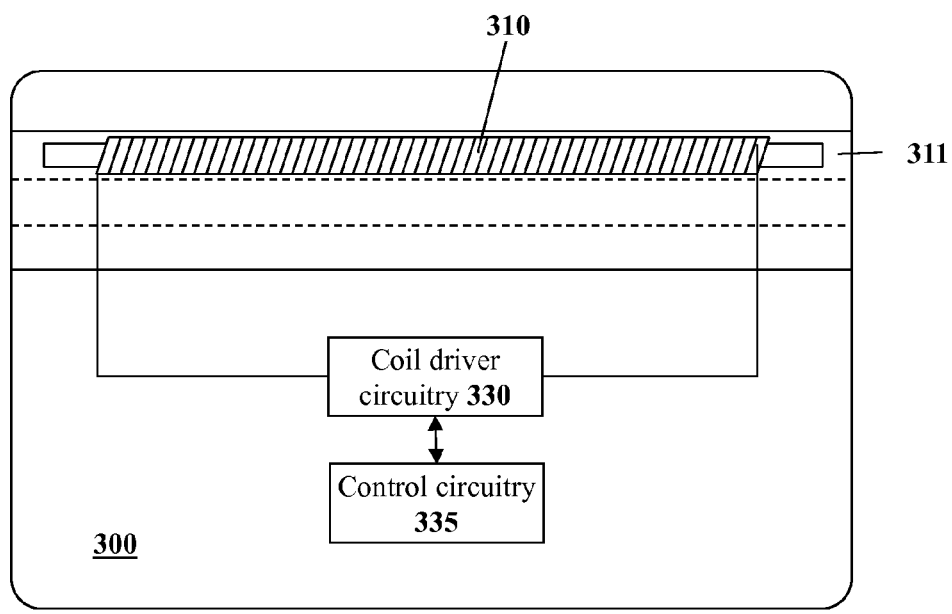
FIG. 3 illustrates a programmable dynamic magnetic stripe card with a single solenoid coil.

Just as magnetic flux reversals induce an electrical current in a coil, driving an electrical current in a solenoid coil creates a related magnetic field as per Ampere's law. By driving an alternating current, magnetic field reversals may be created. Thus, by appropriately driving an alternative electrical current in a solenoid coil, the coil may be used to emulate the magnetic stripe of a magnetic stripe card. FIG. 3 illustrates a diagram of a programmable dynamic magnetic stripe card 300 that has a coil 310 in the first track 311 location where a traditional magnetic stripe card would have a first magnetic stripe. The solenoid coil 310 may be driven by coil driver circuitry 330. By having the coil driver circuitry 330 appropriately drive an alternating current in the solenoid coil 310 while the programmable dynamic magnetic stripe card 300 swiped in a magnetic card reader, the programmable dynamic magnetic card 300 can emulate a traditional magnetic stripe card. Specifically, the coil driver circuitry 330 modulates the alternating current through the solenoid coil 310 in time to mimic the external magnetic flux changes that a read-head measures during the swipe of a conventional magnetic stripe card.

A programmable dynamic magnetic stripe card 300 can be used to overcome many of the limitations of conventional or static magnetic stripe card. For example, a single programmable dynamic magnetic stripe card 300 can be used to emulate many different conventional magnetic stripe cards. In this manner a user only needs to carry a single programmable dynamic magnetic stripe card 300 instead of a large collection of conventional magnetic stripe cards. Furthermore, the user will not need to search through a collection of many conventional magnetic stripe cards to find the specific conventional magnetic stripe card for the current situation. In a programmable dynamic magnetic stripe card 300, the user accesses control circuitry 335 (such as a microprocessor) to select a specific set of information to emulate. The control circuitry 335 then controls the coil driver circuitry 330 to drive the solenoid coil 310 to output the proper sequence magnetic reversals. Thus, the control circuitry 335, the coil driver circuitry 330, and the solenoid coil 310 of a single dynamic magnetic stripe card 300 can replaces a large collection of conventional magnetic stripe cards.

The solenoid coils for use in a programmable dynamic magnetic stripe card may be constructed using a narrow, fine grained, high permeability core material, with a fast (e.g., 2 to 5 kilohertz or higher) switching capability. In some embodiments, the switching capability of the solenoid coil is greater than five kilohertz. Examples of suitable alloys for the solenoid coil core material include permalloy, Mu-metal, silicon steels, etc.

The total solenoid coil thickness (i.e., the core diameter plus the wire diameter plus any encasing structure, encapsulation, packaging or the like) is less than the thickness of the physical programmable dynamic magnetic stripe card. The International Organization for Standardization ("ISO") specification for payment cards defines the maximum thickness as 0.84 millimeters (0.033 inches), such that in one embodiment the total solenoid coil thickness is less than this amount. In one embodiment, the solenoid coil core diameter is approximately 0.25 mm and the wire diameter approximately 0.10 mm (38 AWG).

Figure 4:
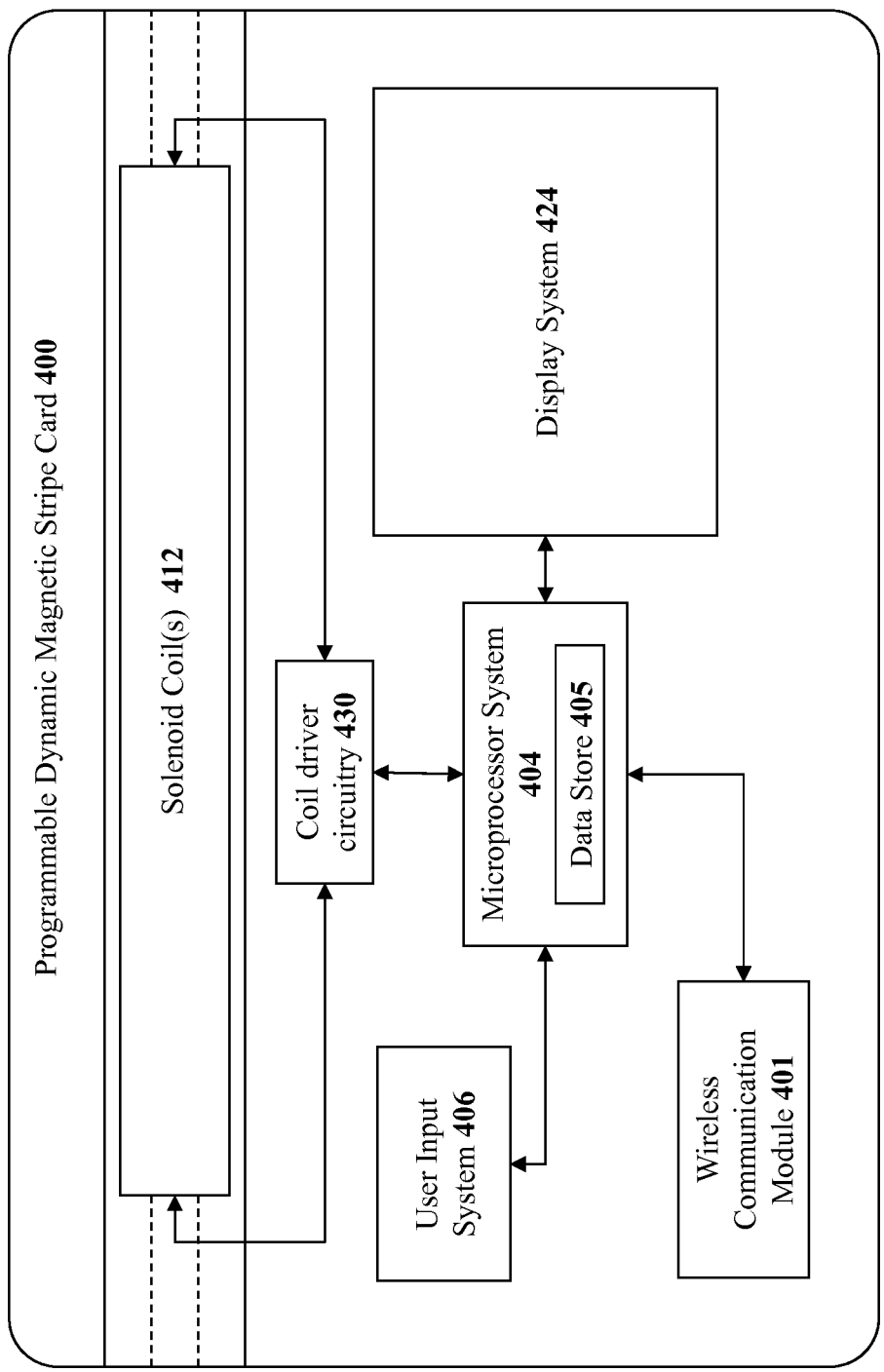
FIG. 4 illustrates a detailed block diagram of a programmable dynamic magnetic stripe card.

FIG. 4 illustrates a more complete block diagram of a programmable dynamic magnetic stripe card 400 with at least one solenoid coil according to one embodiment. The programmable dynamic magnetic stripe card 400 contains at least one solenoid coil 412 in the magnetic stripe section of the card 400. Coil driver circuitry 430 drives the one or more solenoid coils 412 under the control of an on-card microprocessor system 404. Specifically, the microprocessor system 404 may select information for a specific conventional magnetic stripe card from a data store 405 and then instruct the coil driver circuitry 430 to dynamically transmit the information in the form of a changing magnetic field by driving the one or more solenoid coils 412 with the appropriate electrical current. Thus, the one or more solenoid coils 412 of the programmable dynamic magnetic stripe card 400 can be controlled by the microprocessor system 404 on the card 400 to transmit the information from many different conventional magnetic stripe card stored in data store 405. This is far more convenient than simple conventional magnetic stripe card that can only store a single static identifier in a conventional magnetic media stripe.

As illustrated in FIG. 4, the programmable dynamic magnetic stripe card 400 may also contain a wireless communication module 401 for communicating with other computing devices such as a handheld mobile computing device such as a smartphone. The wireless communication module 401 may communicate with one of many different wireless communication systems such as Bluetooth, Wi-Fi, Near Field Communication (NFC), or any other suitable wireless protocol. In various embodiments of the present invention, the programmable dynamic magnetic stripe card 400 may receive information about new magnetic card information that the microprocessor system 404 may store in data store 405.

The programmable dynamic magnetic stripe card 400 may also include a user input system 406 and a display system 424 so that a user may interact with the programmable dynamic magnetic stripe card 400. The display system 424 may comprise a graphical display screen for outputting graphical images and text. The user input system 406 may consist of a few buttons so that a user may scroll through a list of items on a menu and select items to perform some function. For example, the display system 424 may display a list of different conventional magnetic stripe cards that have their corresponding magnetic stripe information stored within data store 405. The user can then use the user input system 406 to select a specific conventional magnetic stripe card that will be emulated on the next swipe with the programmable dynamic magnetic stripe card 400.

Dynamic Magnetic Stripe Card Magnetic Field Creation Issues

Figure 5:
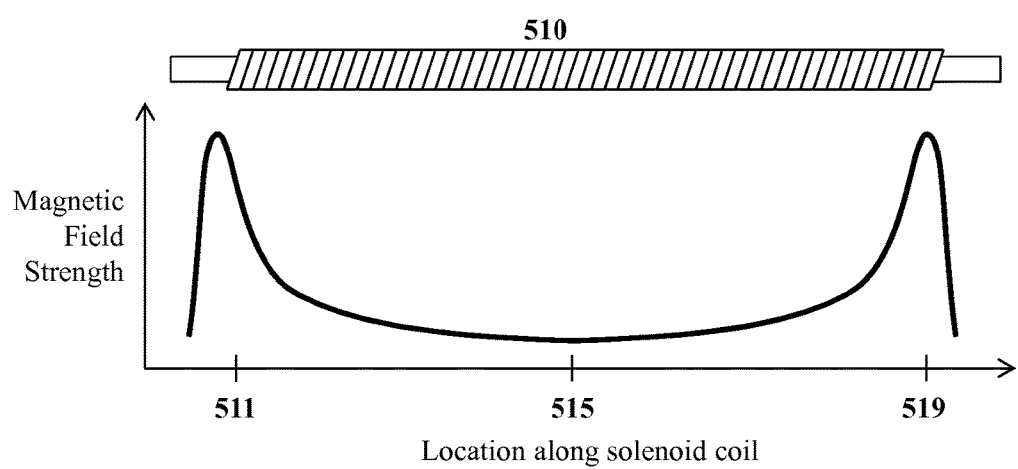
FIG. 5 illustrates the external magnetic field amplitude along the long axis of a solenoid coil in a single solenoid coil design.

Referring back to FIG. 3, a dynamic magnetic stripe card 300 may be constructed with a single solenoid coil 310 in a magnetic stripe track 311 for creating a magnetic field. However, with the single coil magnetic stripe card design of FIG. 3, there is a large change in the magnitude of the external magnetic field created between the ends of the solenoid coil 310 and the center of the solenoid coil 310 as illustrated in FIG. 5. Since the magnetic field output by the solenoid coil 510 is much stronger at the ends (511 and 519) compared to center 515 of the solenoid coil 510, a magnetic stripe reader may have difficulty reading the information output by the solenoid coil 510.

Specifically, the rapid spatial variation of the magnetic field from ends (511 and 519) to center 515 of solenoid coil 510 in addition to the active modulation induced variation of the magnetic field when the dynamic magnetic stripe card is swiped results in unreliable data transmission. Thus, fast dynamic magnetic stripe card swipes frequently result in read inaccuracies and read failures. This often requires that the dynamic magnetic stripe card be swiped multiple times at slower speeds before the data stored on the dynamic magnetic stripe card can be accurately read by a magnetic card reader. Such a user experience would be deemed unacceptable.

One may attempt to compensate for the weaker magnetic strength in the center of the solenoid coil 510 by increasing the electrical current in order to increase the magnetic field strength when the swipe is in the center 515 of the solenoid coil 510. However, increasing the current to increase the magnetic field strength is not a tenable solution because this often results in the read-head coil experiencing signal saturation due to excessive field strength near the ends (511 and 519) of the solenoid coil 510. Furthermore, increasing the electrical current results in excessive power draw thus leading to shorter battery life. In addition, the excessive field strength at the ends of the solenoid coil 510 may result in significant cross-talk and interference between two different tracks on the same card thus resulting in inaccuracies and unreliable transmission of both the tracks using dynamic magnetic stripe coils.

Dynamic Magnetic Stripe Card with Multiple Solenoid Coils

Figure 6A:
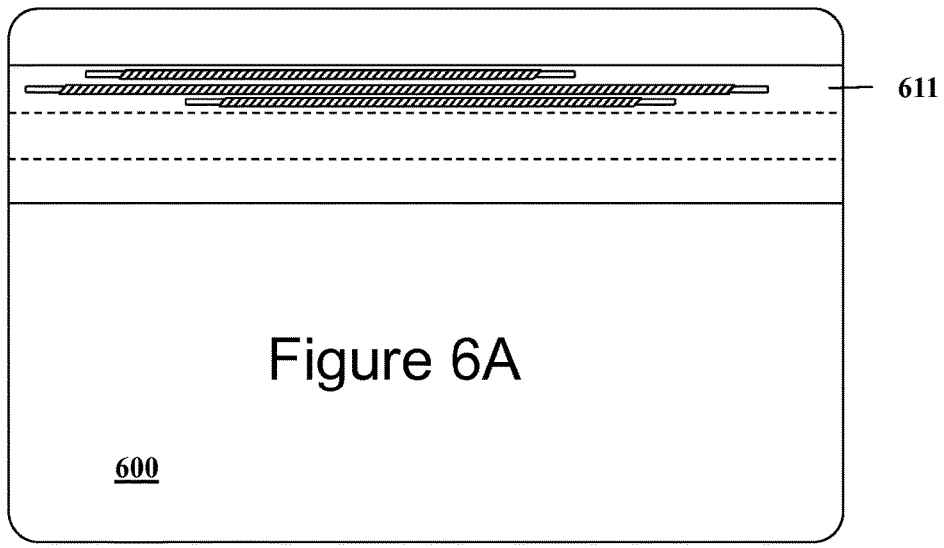
FIG. 6A illustrates a programmable dynamic magnetic stripe card with a three solenoid coils in a single magnetic stripe track.

Another method of addressing the issue of a weak magnetic field is to use multiple parallel solenoid coils arranged in an overlapping manner in order to create a more even magnetic field. FIG. 6A illustrates a programmable dynamic magnetic stripe card 600 that has three solenoid coils located in the first track 611 of the magnetic stripe area. The magnetic field created by the three overlapping solenoid coils located in the first track 611 will combine to create a more consistent stable magnetic field strength.

Figure 6B:
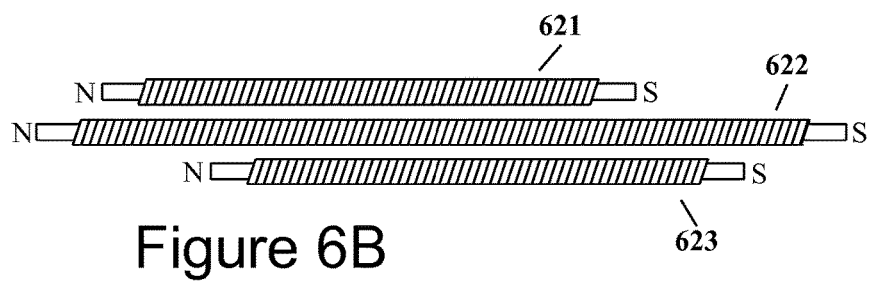
FIG. 6B illustrates a close up view of the arrangement of three solenoid coils from the embodiment of FIG. 6A.

The example programmable dynamic magnetic stripe card 600 of FIG. 6A illustrates an embodiment where there are there are three solenoid coils but another programmable dynamic magnetic stripe card could use two, four, or more solenoid coils in other embodiments. FIG. 6B illustrates a more detailed diagram of the solenoid coil arrangement from FIG. 6A. Not that the solenoid coils are arranged such that the magnetic poles are aligned with all of the north poles (N) oriented towards one end of the X axis of the card and all of the south poles (S) oriented towards the other end of the card. In one embodiment illustrated in FIG. 6B, the center solenoid coil 622 spans a length L, with adjacent coils (621 and 623) being shorter than L (e.g., ½ L, ⅓ L, etc.).

Figure 6C:
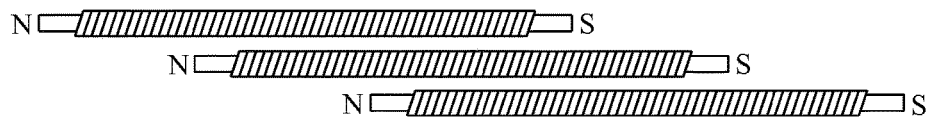
FIG. 6C illustrates a close up view of an alternate arrangement of three solenoid coil design.

In another embodiment, illustrated in FIG. 6C, multiple solenoid coils of equal length are arranged in a staggered placement. Again, note that the magnetic poles are aligned on the X axis of the programmable dynamic magnetic stripe card (not shown). Note that the arrangements of FIGS. 6B and 6C may be implemented with other numbers of solenoid coils such as two, four, or more solenoid coils. Furthermore, many other types of multiple coil arrangements may be used to improve the quality of the magnetic field. In another alternate embodiment (not shown) multiple solenoid coils may be placed in-line with each other and controlled with different coil driver circuits as illustrated in the drive arrangement of FIG. 8A. In other alternate embodiment of a multiple solenoid coil system, the various different solenoid coils may be wound around the same core but controlled individually.

The multiple solenoid coils in the embodiments of FIGS. 6A, 6B, and 6C may be wired in series or powered individually. As will be described in greater detail below, the solenoid coils can be driven through an active or passive driver circuit for pulse shaping in order to obtain an optimal interaction with a magnetic stripe card reader.

In one embodiment, all of the multiple coils are placed within a single track of a multi-track programmable dynamic magnetic stripe card as illustrated in FIG. 6A. In this embodiment, the combined width of all the solenoid coils is less than the width of a single track (i.e., 0.11 inches in the case of a standard three track stripe). In another embodiment, the solenoid coils are placed over two tracks of the stripe.

Figure 7:
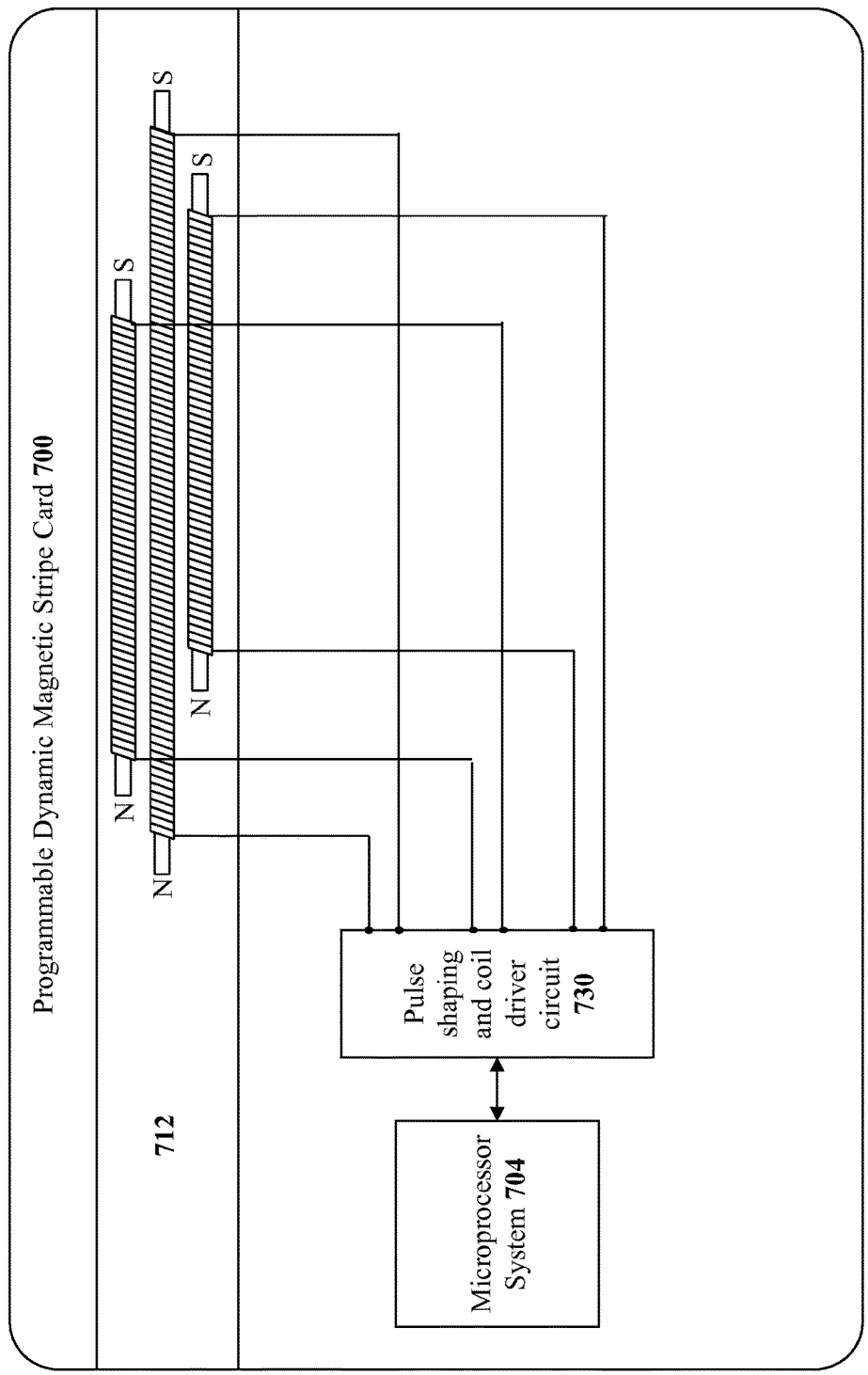
FIG. 7 illustrates a multiple solenoid coil design wherein the solenoid coils are energized simultaneously in synchronization by a single driver circuit.

The individual solenoid coils may be individually driven through independent driver circuits or driven simultaneously through a common driver. FIG. 7 illustrates a block diagram of a first embodiment wherein the microprocessor system 704 controls a single pulse shaping and coil driver circuit 730 that simultaneously energizes three solenoid coils in synchronization. In this embodiment, when the programmable dynamic magnetic stripe card is swiped and the magnetic stripe area 712 traverses a magnetic card reader, the arrangement of the solenoid coils generates a magnetic field with an approximately uniform amplitude. Thus, the magnetic read will accurately head sense the series of magnetic field reversals.

Figure 8:
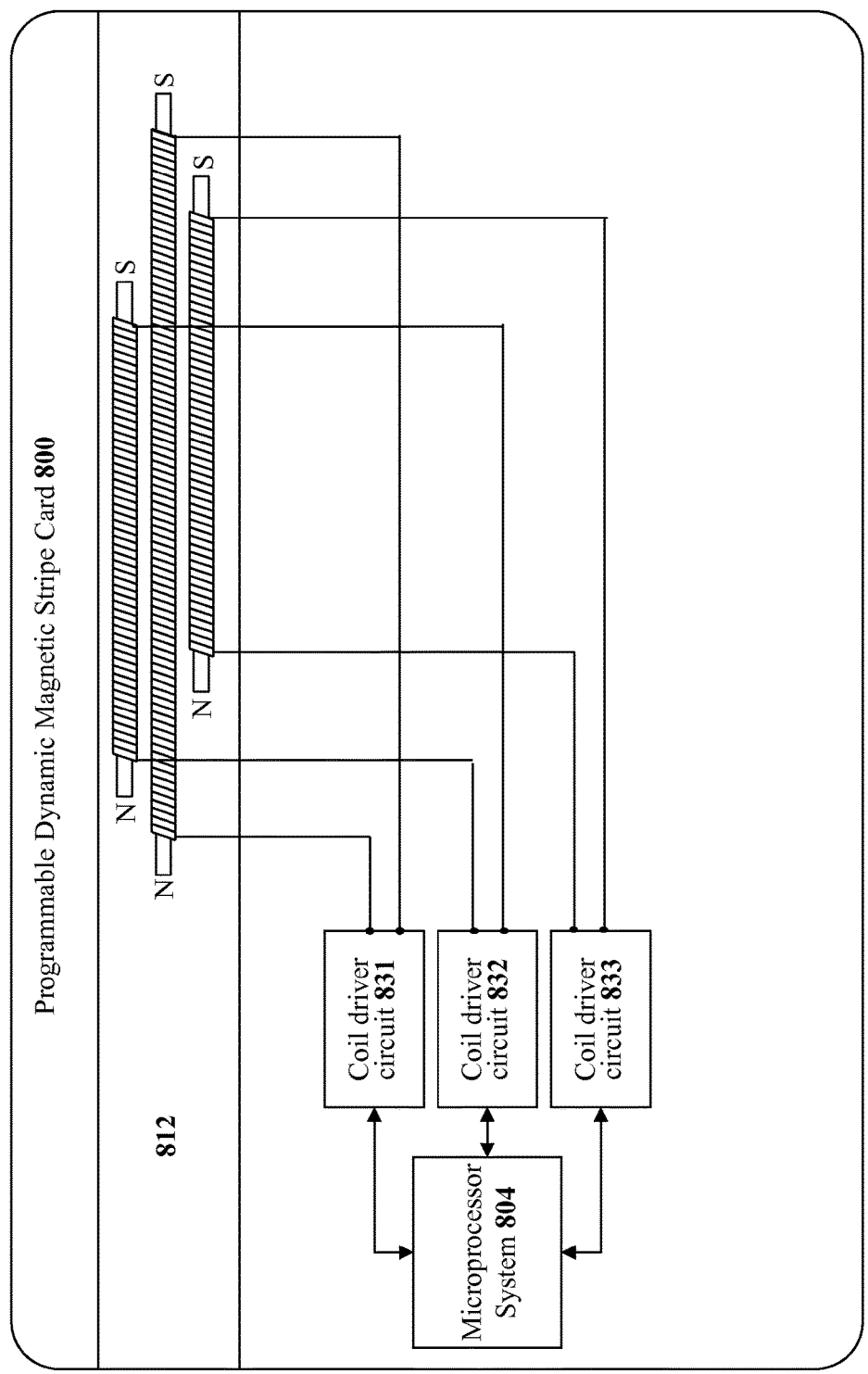
FIG. 8 illustrates a multiple solenoid coil design wherein the timing of the energizing of the solenoid coils is controlled by three different driver circuits.

An alternate embodiment is illustrated in FIG. 8 wherein which the solenoid coils are energized individually by three different driver circuits 831, 832, and 833. The three different three different driver circuits 831, 832, and 833 are timed to vary their relative strengths based on their position relative to the magnetic card reader read head sensor. The arrangement of FIG. 8 results in the magnetic card reader read head sensing a more uniform amplitude of the transmitted pulses as the programmable dynamic magnetic stripe card traverses the magnetic card reader when compared to the previous embodiment in which the energizing of the coils is simultaneous.

Dynamic Magnetic Stripe Card with Biasing Magnet

The multiple solenoid coil systems illustrated in FIGS. 6A, 6B, and 6C improve the magnetic field output by the programmable dynamic magnetic stripe card relative to the simple single solenoid coil programmable dynamic magnetic stripe card of FIG. 3. However, the created magnetic field is still less than optimal. Furthermore, the multiple solenoid coil systems require sophisticated coil driver circuitry. In another embodiment of the programmable dynamic magnetic stripe card of the present invention, the magnetic field created by a single solenoid coil magnetic stripe may be improved by using a nearby biasing external magnetic field that can bias the output of the solenoid coil. This comprises an alternate single coil design that can substantially improve the uniformity of the magnetic field over the length of the solenoid coil.

Figure 9A:
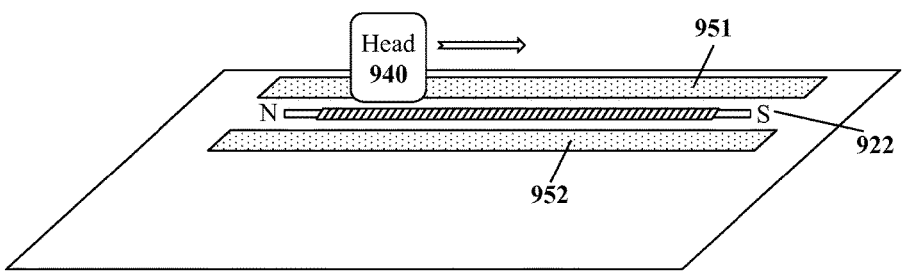
FIG. 9A illustrates an oblique view of programmable dynamic magnetic stripe card that uses biasing magnets to improve the magnetic field created by a solenoid coil.
Figure 9B:
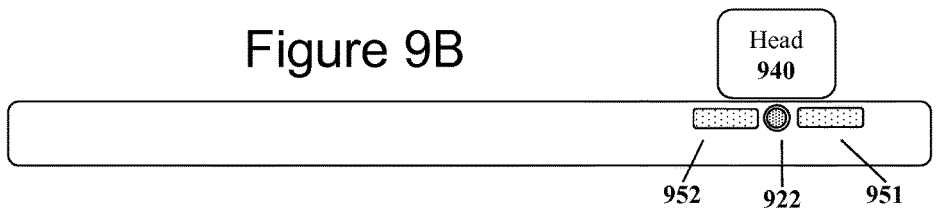
FIG. 9B illustrates a side view of the embodiment of FIG. 9A.

FIG. 9A illustrates an oblique view of an embodiment that uses biasing magnets to improve the magnetic field created by a solenoid coil. Specifically, as illustrated in FIG. 9A, a single solenoid coil 922 is located between two biasing magnets 951 and 952. In this embodiment, the solenoid coil 922 is positioned in a biasing external magnetic field applied in a direction perpendicular to the longitudinal axis. A side view of the design of FIG. 9A is illustrated in FIG. 9B wherein the two biasing magnets 951 and 952 surround the circular core of the solenoid coil 922.

Figure 9C:
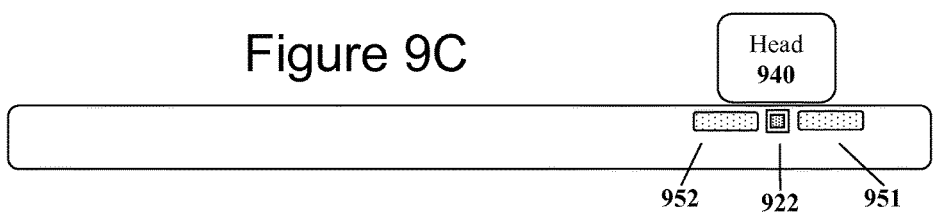
FIG. 9C illustrates the side view of FIG. 9A wherein the solenoid coil core has a rectangular or square cross-section.

Note that in this programmable dynamic magnetic stripe card embodiment and all the other programmable dynamic magnetic stripe card embodiments of this document, the solenoid coil may be constructed with a different shape to alter the performance. For example, since an increased size of the cross section area of the solenoid core can strengthen the magnetic field that will be created, a square or rectangular solenoid coil core 922 may be used as illustrated in FIG. 9C.

The biasing external magnetic field may be generated by permanent biasing magnets or biasing electromagnets on both sides of the solenoid coil. In another embodiment, the biasing external magnetic field may be generated by a permanent biasing magnet on one side and a biasing electromagnet on the other side of the solenoid coil (not illustrated).

Figure 10B:
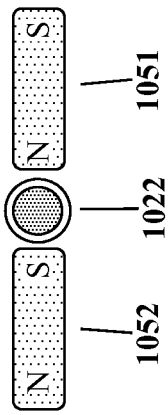
FIG. 10B illustrates a side view of the embodiment of FIG. 10A.
Figure 10C:
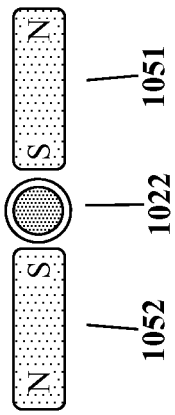
FIG. 10C illustrates the side view of FIG. 10A wherein the polarity of one of the biasing magnets has been reversed.
Figure 10A:
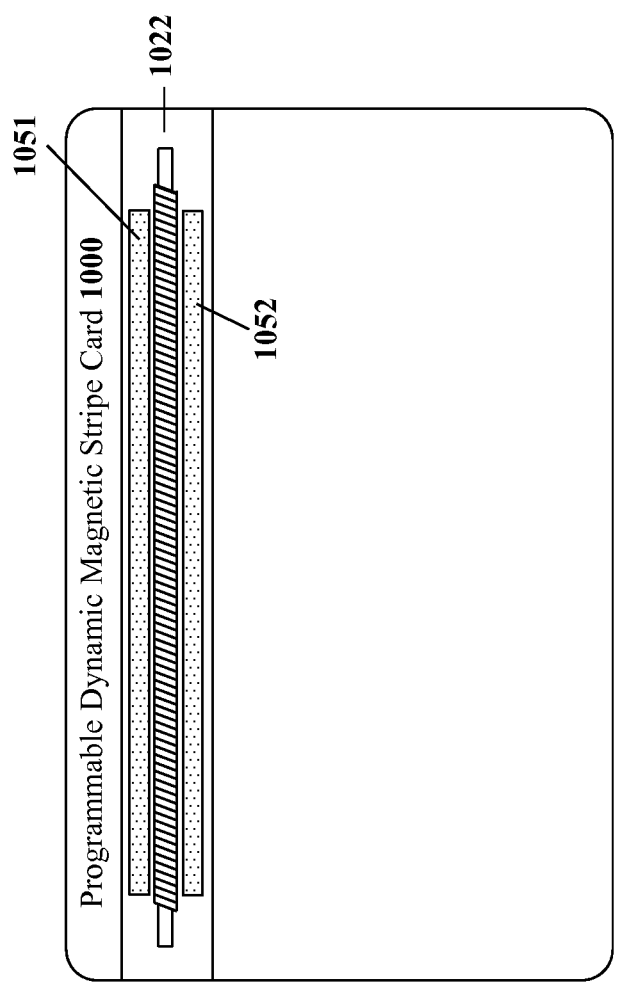
FIG. 10A illustrates a plane view of programmable dynamic magnetic stripe card of FIG. 9A.

FIG. 10A illustrates a flat view of a programmable dynamic magnetic stripe card 1000 with a single solenoid coil 1022 surrounded by two biasing magnets 1051 and 1052. FIG. 10B illustrates a side view that illustrates one possible orientation of the two biasing magnets 1051 and 1052 that surround the solenoid coil 1022. Note that the polarity of one or more of the biasing magnets may be reversed. FIG. 10C illustrates a side view similar to FIG. 10B except that the polarity of biasing magnet 1051 has been reversed.

Permanent static biasing magnets can be made of flexible material or an array of rigid magnets, and spanning the length of the solenoid coil. In the case of multiple external biasing magnets, the length and relative orientation of the individual biasing magnets can be adjusted as well for increased magnetic field strength as well as magnetic field uniformity along the length of the coil as measured by a read head sensor.

Figure 11B:
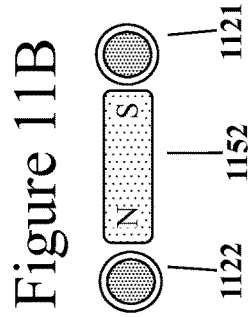
FIG. 11B illustrates a side view of the embodiment of FIG. 11A.
Figure 11C:
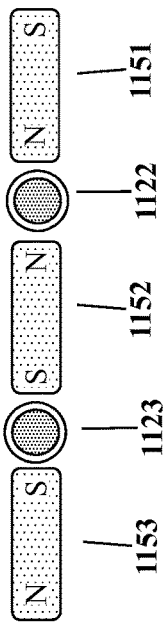
FIG. 11C illustrates a side view of an embodiment that uses three biasing magnets to improve the magnetic fields created by two adjacent solenoid coils.
Figure 11A:
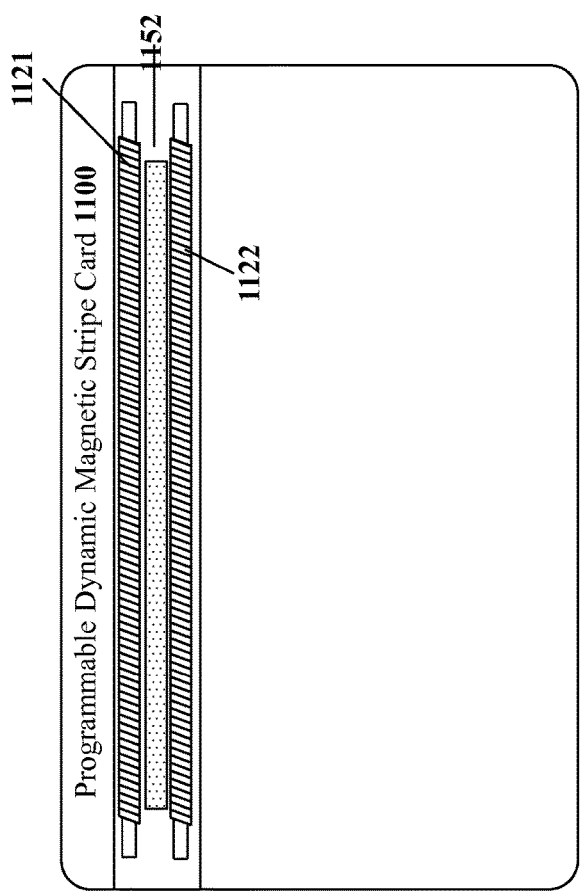
FIG. 11A illustrates a plane view of programmable dynamic magnetic stripe card that uses a single biasing magnet to improve the magnetic fields created by two adjacent solenoid coils.

In yet another embodiment, a single biasing magnet may be used to help the magnetic fields generated by two different solenoid coils. Specifically, FIG. 11A illustrates a plane card view of a programmable dynamic magnetic stripe card 1100 embodiment wherein a single biasing magnet 1152 is used to help improve the magnetic fields created by solenoid coils 1121 and 1122 that are adjacent to biasing magnet 1152. FIG. 11B illustrates the side view of the single biasing magnet 1152 that is used to improve the magnetic fields created by solenoid coils 1121 and 1122. The solenoid coil can be wound around a narrow core such that the width is minimized resulting in minimal interference between adjacent tracks.

Many other embodiments may be created with various different arrangements of magnetic stripes (permanent or electromagnetic) and solenoid coils. FIG. 11C illustrates the side view of an embodiment wherein three biasing magnets 1151, 1152, and 1153 are used to help improved the magnetic fields created by two solenoid coils 1121 and 1122.

In addition to improving the magnetic field quality, the biasing magnets may also help with reducing cross-talk. Specifically, various different placements of biasing magnets may also be used to reduce cross talk between the multiple tracks on a single magnetic card. Thus, the biasing magnets can help allow multiple solenoid coils operate simultaneously without interfering with each other.

Dynamic Magnetic Stripe Card Swipe Start and Swipe Speed Detection

In order to properly output alternating current to control a solenoid coil in a programmable dynamic magnetic stripe card, the programmable dynamic magnetic stripe card must first detect when a swipe is starting and how fast the user is swiping the card. The card must detect a swipe start to prepare the solenoid driver circuitry for operation.

Once the start of a swipe has been detected, the programmable dynamic magnetic stripe card must determine the speed of the swipe for two reasons. First, the programmable dynamic magnetic stripe card must know the speed to determine how long to delay before starting to output magnetic signals representing data. Specifically, the driver circuitry must wait until the read head of the card is over the solenoid coil(s) that will be outputting the magnetic field. Second, the programmable dynamic magnetic stripe card must know the speed to determine how long fast the data must be output. The faster the user is swiping the card, the faster the data must be output.

Figure 12:
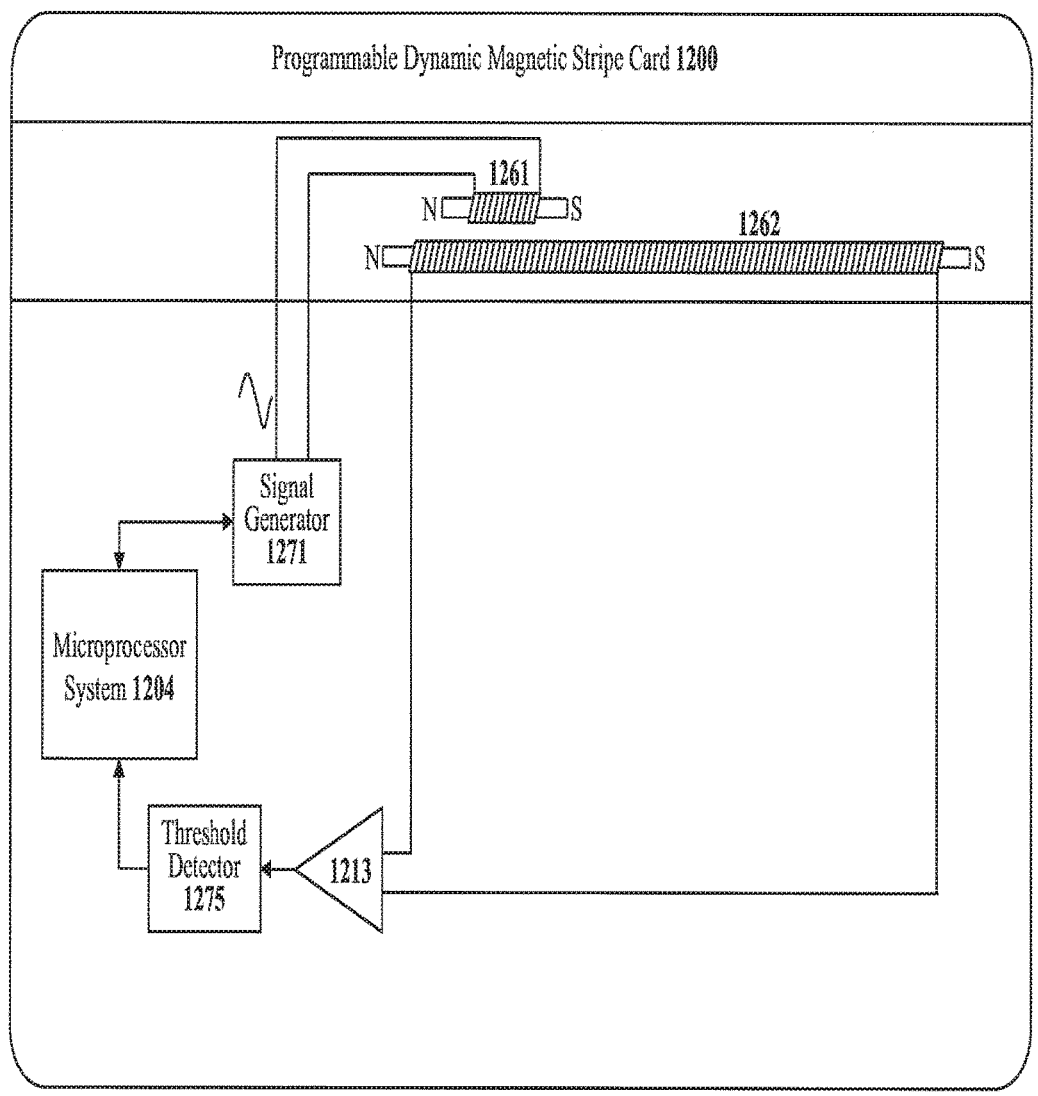
FIG. 12 illustrates a plane and side view of an embodiment in which a single common magnetic material between two tracks can be used for providing the biasing external magnetic field to both tracks.

FIG. 12 illustrates a first embodiment of a programmable dynamic magnetic stripe card 1200 with a swipe detector that uses multiple solenoid coils to detect a swipe in a magnetic card reader. The swipe detection mechanism of FIG. 12 makes use of the modulation of mutual inductance and coupling between multiple coils (coils 1261 and 1262 in the example of FIG. 12). When a user swipes programmable dynamic magnetic stripe card 1200 past the read head of a magnetic card reader (usually made of high magnetic permeability alloy), the read head will pass over the two coils 1261 and 1262 in close proximity.

In the embodiment of FIG. 12, solenoid coil 1261 is driven by a signal generator circuit 1271 that produces an alternating or time varying signal. Solenoid coil 1262 is used as a detection coil measuring the signal being emitted by solenoid coil 1261. When the read head of a magnetic card reader passes over the coils 1261 and 1262 in close proximity, the high magnetic permeability of the read head material increases the magnetic coupling between the two coils 1261 and 1262. This coupling in turn causes the amplitude of the electrical signal induced in solenoid coil 1262 to increase. The electrical signal induced in solenoid coil 1262 may be amplified by amplifier 1213 and then detected by an appropriate threshold detection circuit 1275. Thus, the detection of a read head from magnetic card read allows the start of a swipe to be detected.

In one embodiment, this detection scheme can be enabled by making use of the same set of solenoid coils that are used to create a magnetic field for transmission of data to the read head of a magnetic card reader. In another embodiment, coil 1261, coil 1262, or both coils may be dedicated solenoid coil(s) used just for the detection of a swipe.

This swipe detection scheme may also be used to measure the speed at which the user is swiping the programmable dynamic magnetic stripe card 1200. For example, the speed may be detected based on the rate of increase of the signal detected by coil 1262. Alternatively, the speed may be detected by how long the signal is detected on coil 1262 since that will be proportional to the time that read head was near coil 1261.

In addition to determine a delay before the data output and the speed of the data output, the speed data can also be used to adjust the synchronization or time variation of the relative strengths between the transmission coils in the multiple coil schemes disclosed with reference to FIGS. 6A to 6C.

The dual coil system used to detect a swipe requires a signal generator circuit 1271, an amplifier 1213, and a threshold detection circuit 1275. It would be desirable to reduce the number of circuits required due to the small size of the programmable dynamic magnetic stripe card. Thus, an alternate swipe detection system would be desirable.

Figure 13A:
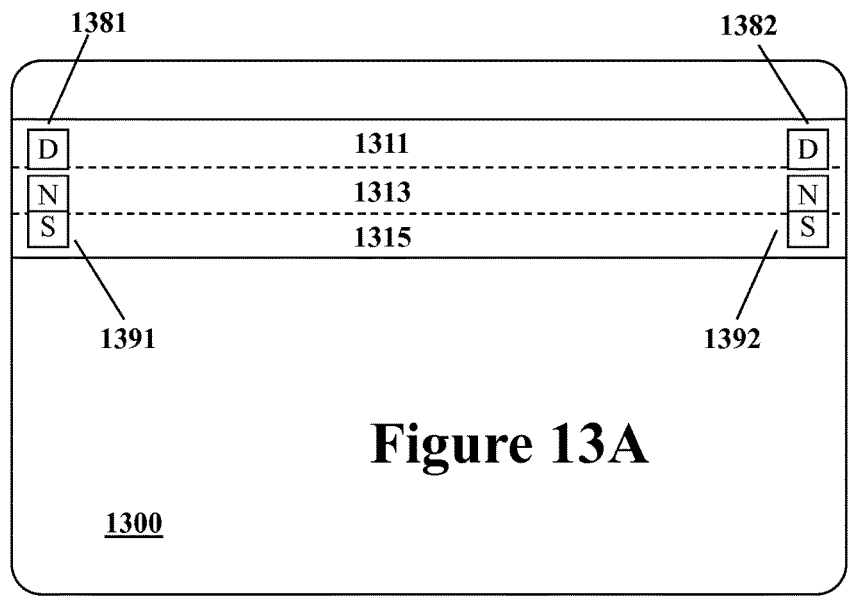
FIG. 13A illustrates a programmable dynamic magnetic stripe card with a magnet and magnetic field detector swipe detection mechanism.

FIG. 13A illustrates a programmable dynamic magnetic stripe card 1300 that uses a different swipe detection mechanism. On each end of the magnetic stripe region of the programmable dynamic magnetic stripe card 1300, a small magnet (1391 and 1392) and a magnetic field detector (1381 and 1382) are mounted for detecting card reader swipes. The magnet (1391 and 1392) is used to create a small local magnetic field and the magnetic field detector (1381 and 1382) is used to detect magnetic field changes. The magnetic field detectors (1381 and 1382) may be Hall Effect sensors or any other suitable sensor for detecting changes in a magnetic field. This document will use the generic term magnetic field detector but any such device may be a Hall Effect sensor.

Figure 13B:
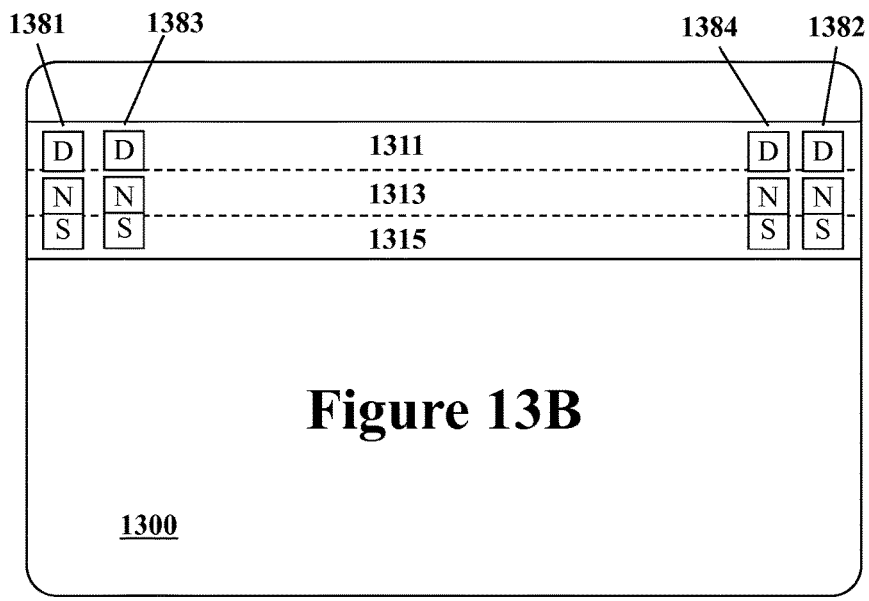
FIG. 13B illustrates a programmable dynamic magnetic stripe card with two pairs of magnet and magnetic field detector swipe detection mechanisms.

The magnet (1391 and 1392) and magnetic field detector (1381 and 1382) pairs are mounted on both sides because card readers can read the magnetically stored data using a swipe in either direction (left to right or right to left). In some embodiments, as illustrated in FIG. 13B, two pairs of magnets and magnetic field detectors are stored at each end.

Various different versions of swipe detection systems may be constructed using a magnet and magnetic field detector pair. This document will describe three possible implementations but other variants are possible.

Figure 14B:
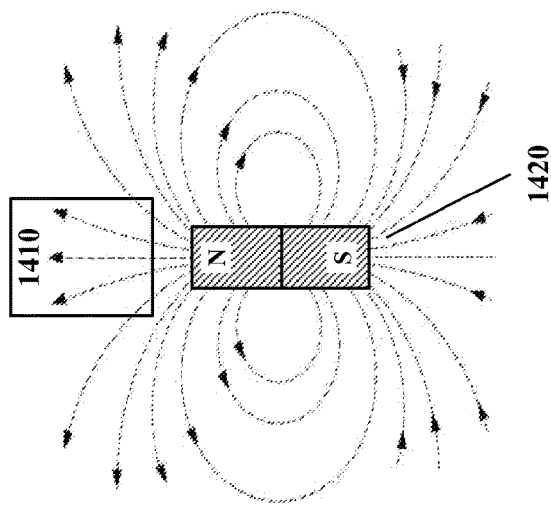
FIG. 14B illustrates a top view of the first swipe detection system using the magnets and magnetic field detectors from FIG. 14A.
Figure 14A:
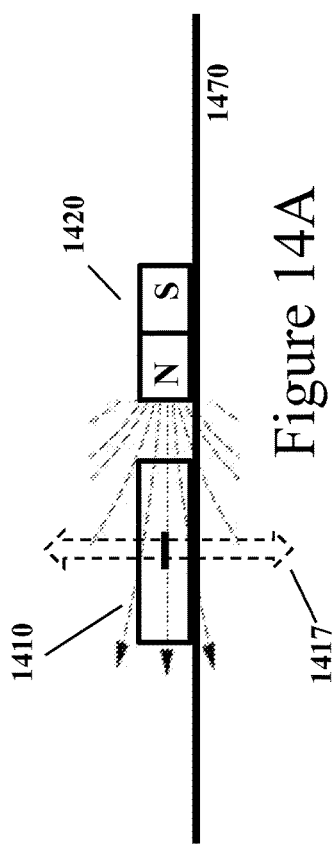
FIG. 14A illustrates a side view of a first swipe detection system using the magnets and magnetic field detectors.

In a first swipe detection system using the magnets and magnetic field detectors illustrated in side view form in FIG. 14A, the magnet 1420 emits a magnetic field in a horizontal direction through a magnetic detector 1410 that is designed to detect vertical magnetic fields. Specifically, magnetic detector 1410 is designed to detect magnetic fields oriented in the direction 1417. Thus, the magnetic detector 1410 will not normally detect the magnetic field emanating from magnet 1420. FIG. 14B illustrates a top down view of the magnetic detector 1410, the magnet 1420, and the magnetic field from the magnet 1420.

Figure 14C:
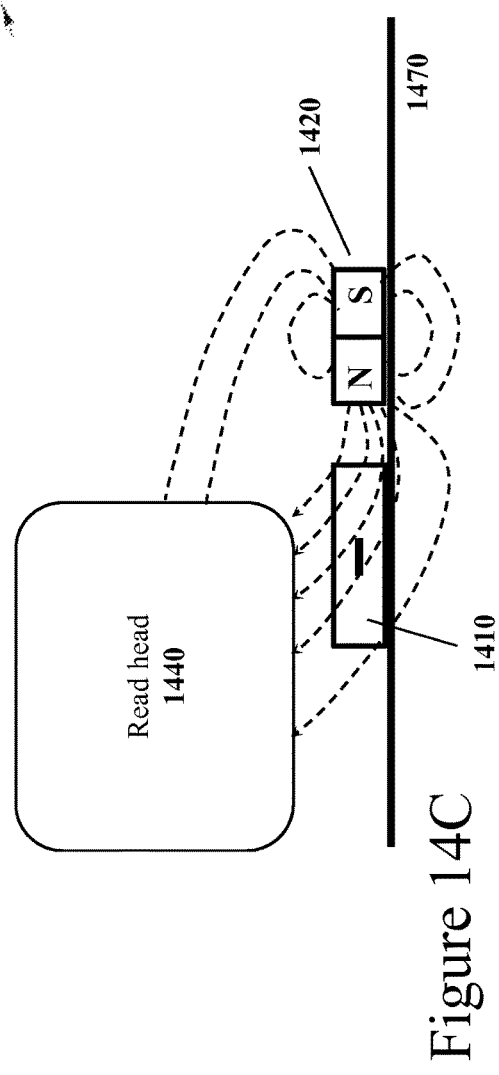
FIG. 14C illustrates the swipe detection system of FIG. 14A detecting a read head.

The read head of a magnetic card reader is constructed from a material with a very high magnetic field permeability. Thus, a read head tends to bend the nearby magnetic fields to pass through the high-permeability read head. An example of this effect is illustrated in FIG. 14C wherein as read head 1440 approaches the magnet 1420, the high-permeability material in the read head 1440 bends the magnetic field to pass through the read head 1440. This causes the magnetic field to have a more vertical direction through the magnetic detector 1410 such that the magnetic detector 1410 can signal that a swipe has started.

Figure 15A:
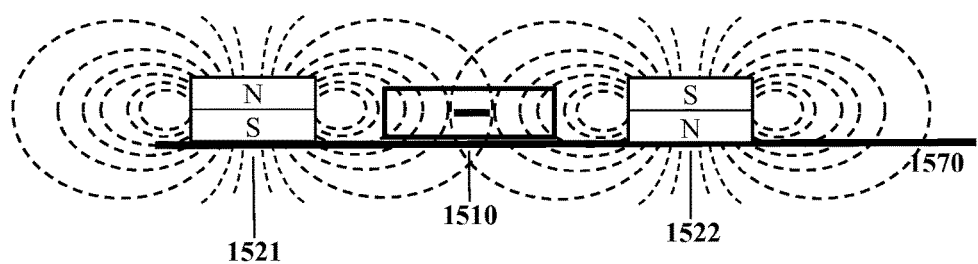
FIG. 15A illustrates a side view of a second swipe detection system using the magnets and magnetic field detectors.
Figure 15B:
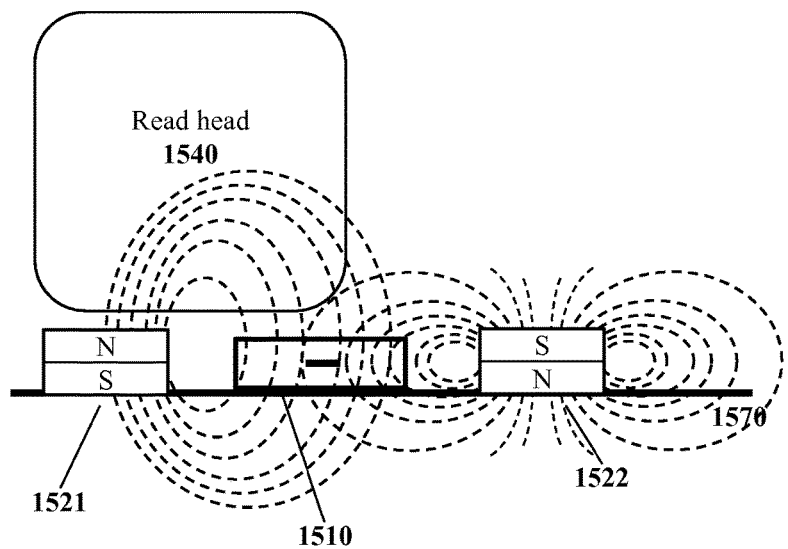
FIG. 15B illustrates the swipe detection system of FIG. 15A detecting a read head.

FIGS. 15A and 15B illustrate a second swipe detection system using the magnets and magnetic field detectors. FIG. 15A illustrates a side view of a first magnet 1521, a magnetic detector 1510, and a second magnet 1522 mounted onto a circuit board 1570. The bias magnets are oriented with polarity reversed and placed such that the magnetic field strength within the magnetic detector 1510 is below the threshold for detection. This can be accomplished with cancellation effects between the two magnets (1521 and 1522). Specifically, the magnetic field from biasing magnet 1521 passes through the magnetic detector 1510 with a first polarity and the magnetic field from biasing magnet 1522 passes through the magnetic detector 1510 with an opposite polarity thus cancelling out the magnetic field. The magnetic detector 1510 is configured to detect vertical magnetic fields.

When a read head 1540 from a magnetic card reader approaches the magnets (1521 and 1522), the high-permeability material in the read head 1540 will distort the magnetic fields of the magnet 1521 as illustrated in FIG. 15B. Specifically, the presence of the high-permeability read head 1540 approaching the swipe detection system causes the magnetic field lines from magnet 1521 to be stronger in the area around the magnetic detector 1510 than the magnetic field lines from magnet 1522. Thus, the strength of the magnetic field from magnet 1521 will be stronger than the magnetic field lines from magnet 1522 resulting in a significant net vertical magnetic field within magnetic detector 1510. Thus, the magnetic detector 1510 will detect the beginning of a swipe.

Figure 16A:
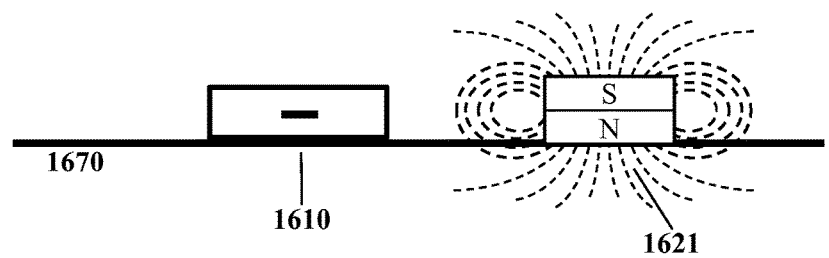
FIG. 16A illustrates a side view of a third swipe detection system using the magnets and magnetic field detectors.
Figure 16B:
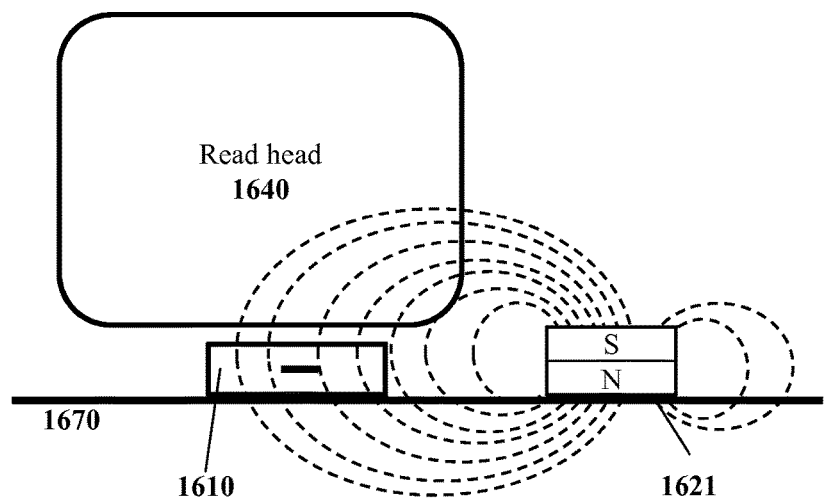
FIG. 16B illustrates the swipe detection system of FIG. 16A detecting a read head.

FIGS. 16A and 16B illustrate a third swipe detection system that may be constructed using a magnet and a magnetic field detector. FIG. 16A illustrates a side view of a magnetic detector 1610 and a magnet 1621 mounted onto a circuit board 1670. The magnet 1621 is placed far enough away from magnetic detector 1610 such that the magnetic field strength within the magnetic detector 1610 is below the threshold for detection. The magnetic detector 1610 is configured to detect vertical magnetic fields.

Referring to FIG. 16B, when a read head 1640 from a magnetic card reader approaches the magnetic detector 1610 and magnet 1621, the high-permeability material in the read head 1640 will distort the magnetic field from magnet 1621 as illustrated in FIG. 16B. Specifically, the presence of the high-permeability material in the read head 1640 will cause the net magnetic field due to the magnet 1621 at the magnetic detect 1610 to exceed the threshold of detection. Thus, the magnetic detector 1610 can detect the beginning of a swipe of the programmable magnetic stripe card.

Dynamic Magnetic Stripe Card Swipe Operation

The previous sections of this document disclose the overall architecture of a programmable dynamic magnetic stripe card, techniques for creating even strength magnetic fields across the length of a solenoid coil, and techniques for detecting when the a programmable dynamic magnetic stripe card is swiped through a magnetic card reader. This section describes how all of these techniques may be combined to have a programmable dynamic magnetic stripe card properly emulate a conventional magnetic stripe card when swiped through a magnetic card reader.

Figure 17:
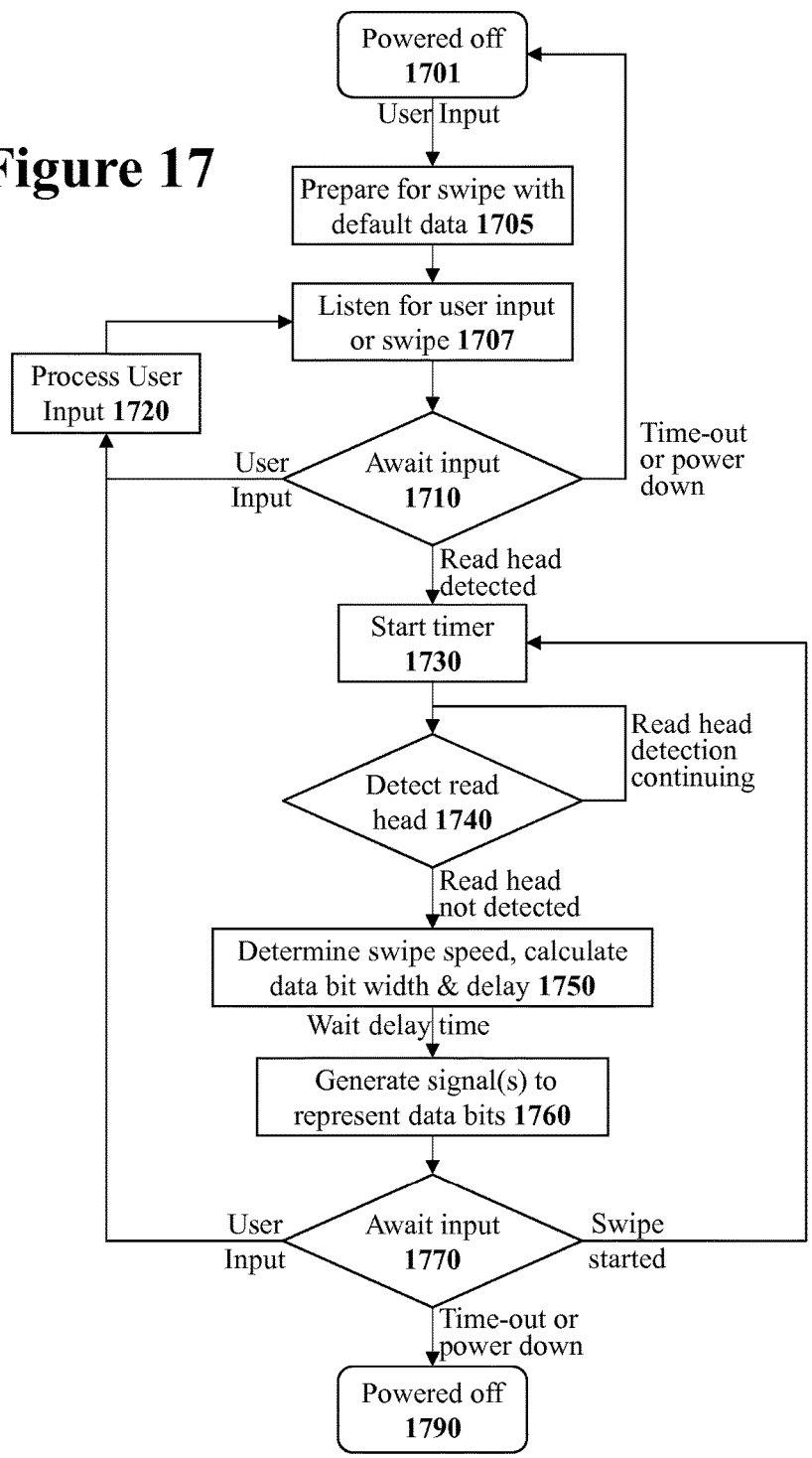
FIG. 17 illustrates a flow diagram describing the stages of having a programmable dynamic magnetic stripe card output data into a magnetic card reader.

FIG. 17 illustrates a flow diagram describing the stages of having a programmable dynamic magnetic stripe card output data into a magnetic card reader. Initially, at stage 1701, the programmable dynamic magnetic stripe card is in a powered down state. This may be a completely powered down state or a very low-powered sleep state depending on the embodiment. Upon receiving user input, the programmable dynamic magnetic stripe card proceeds to stage 1705 wherein the programmable dynamic magnetic stripe card prepares for a swipe using some default data from conventional magnetic stripe card.

The default data may be a particular credit card that a user uses most of the time. The default data may also be the last data used in the previous swipe. In some embodiments, the programmable dynamic magnetic stripe card may select a particular magnetic stripe card data based upon current information such as the current GPS coordinates or the detection of a particular Wi-Fi, Bluetooth, NFC, or similar wireless signal.

After preparing for a swipe at stage 1705, the programmable dynamic magnetic stripe card enters stage 1707 wherein it waits for some event to occur. When an event occurs, a decision is made at stage 1710. If nothing further happens within a specified time-out period, the programmable dynamic magnetic stripe card may simply return back to the powered-down (or stand-by) stage 1701. This may happen if a user decides not to use the card or perhaps the user input that woke up the programmable dynamic magnetic stripe card was accidental.

The programmable dynamic magnetic stripe card may also detect user input from a user input system 406 as illustrated in FIG. 4. When such user input is received, the programmable dynamic magnetic stripe card proceeds to stage 1720 where that user input is processed. The user input may signal may cause the programmable dynamic magnetic stripe card to output different information on the display screen 424. The user input may be the user selecting different magnetic card data to be used for the swipe such as a different credit card. If different card data is selected then the programmable dynamic magnetic stripe card prepares for a swipe using the different card data that was selected. After processing the user input, the system returns to stages 1707 and 1710 to detect another event.

If a read head from a magnetic card reader is detected at stage 1710, the system proceeds to stage 1730. The read head from a magnetic card reader may be detected in a number of different manners as set forth in the earlier section titled "Dynamic Magnetic Stripe Card Swipe Start and Swipe Speed Detection" or in another suitable manner. At stage 1730, the programmable dynamic magnetic stripe card starts a timer to time an event. This may be performed by the microprocessor system 404 on the programmable dynamic magnetic stripe card. The system then proceeds to stage 1740 where the swipe detector may be continually monitored while the timer continues to count time. As long as the read head is detected, the system will remain in stage 1740.

Once the read head from the magnetic card reader is no longer detected, the system proceeds to stage 1750 where the timer is then stopped. The timer will now have an amount of time that the read head was detected. The longer the read head was detected, the slower the user is swiping the card. Similarly, the shorter the read head was detected, the faster the user is swiping the card. Thus, the programmable dynamic magnetic stripe card can calculated a swipe speed based on the amount of time that the read head from the magnetic card reader was detected.

In other embodiments, a different method of calculating the swipe speed may be used. For example, referring to FIG. 13B, the system may count the time between when magnetic field detector 1381 first detects a read head and when magnetic field detector 1383 first detects the read head. This represents the time for the read head to travel from the read head being near magnetic field detector 1381 to being near magnetic field detector 1383 and thus will be inversely proportional to the swipe speed.

Using the calculated swipe speed, the programmable dynamic magnetic stripe card then calculates a delay time and a data bit width. The delay time specifies how long the programmable dynamic magnetic stripe card should wait before outputting magnetic field signals representing data. This delay causes the programmable dynamic magnetic stripe card to wait until the read head of the magnetic card reader is over the solenoid coil(s) that will output the data in the form of magnetic field changes.

The data bit width specifies how wide each data bit is. The faster the swipe speed, the shorter the time for each data bit width and the slower the swipe speed, the longer the data bit width. The goal is to output the data smoothly across the active portion of the solenoid coil(s) as the card is swiped.

After calculating the swipe speed at stage 1750, the programmable dynamic magnetic stripe card then waits the delay time and proceeds to stage 1760 to output the data bits. Specifically, the programmable dynamic magnetic stripe card will generate the alternative current that will create the appropriate pattern of magnetic field reversals that represent the data to output.

After outputting the data bits in stage 1760, the programmable dynamic magnetic stripe card will enter another wait state at stage 1770 where it waits for an event. The event that occurs will determine the next action to take.

If the programmable dynamic magnetic stripe card detects another swipe at stage 1770, the system returns to stage 1730 to handle another swipe. This may occur when the previous swipe was not properly read by the magnetic card reader with the previous swipe such that the user swiped the card again. In some embodiments, the system may make some changes to adjust how it will output the data to improve the chances of a successful data transmission.

Referring back to stage 1770, if user input is detected then the system proceeds back to stage 1720 to process the user input. For example, a user may have decided to switch to a different credit card for this transaction.

Finally, if nothing occurs such that a watch-dog timer times out, the system may proceed to stage 1790 where the programmable dynamic magnetic stripe card is powered down and enters a powered down or stand-by state 1790.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. An apparatus comprising:
a first dynamically controlled solenoid coil configured to generate a first magnetic field;
coil driver circuitry configured to drive data signals in the first dynamically controlled solenoid coil in time with a speed of movement of the apparatus; and
a first biasing magnet positioned adjacent to the first dynamically controlled solenoid coil;
wherein the apparatus is configured to dynamically generate magnetic information patterns using the data signals.

2. The apparatus of claim 1, wherein a first magnetic pole of the first biasing magnet is directly adjacent to the first dynamically controlled solenoid coil.

3. The apparatus of claim 1, wherein a core of the first dynamically controlled solenoid coil has a rectangular cross section.

4. The apparatus of claim 1, further comprising a second biasing magnet positioned adjacent to the first dynamically controlled solenoid coil.

5. The apparatus of claim 4, wherein the first biasing magnet and the second biasing magnet are magnetically aligned in a same magnetic polar direction.

6. The apparatus of claim 4, wherein the first biasing magnet and the second biasing magnet are aligned with opposite magnetic polarity.

7. The apparatus of claim 1, further comprising a second dynamically controlled solenoid coil configured to generate a second magnetic field, wherein the second dynamically controlled solenoid coil is positioned adjacent to the first biasing magnet.

8. The apparatus of claim 7, wherein a first magnetic pole of the first biasing magnet is directly adjacent to the first dynamically controlled solenoid coil, and a second magnetic pole of the first biasing magnet is directly adjacent to the second dynamically controlled solenoid coil.

9. The apparatus of claim 8, further comprising:
a second biasing magnet positioned adjacent to the first dynamically controlled solenoid coil; and
a third biasing magnet positioned adjacent to the second dynamically controlled solenoid coil.

10. A method comprising:
positioning a first dynamically controlled solenoid coil in a magnetic stripe area of a programmable dynamic magnetic stripe card, wherein the first dynamically controlled solenoid coil is configured to generate a first magnetic field;
coupling a coil driver circuit to the first dynamically controlled solenoid coil, wherein the coil driver circuit is configured to drive data signals in the first dynamically controlled solenoid coil in time with a speed of movement of the programmable dynamic magnetic stripe card; and
positioning a first biasing magnet adjacent to the first dynamically controlled solenoid coil;
wherein the programmable dynamic magnetic stripe card is configured to dynamically generate magnetic information patterns using the data signals.

11. The method of claim 10, wherein a first magnetic pole of the first biasing magnet is directly adjacent to the first dynamically controlled solenoid coil.

12. The method of claim 10, wherein a core of the first dynamically controlled solenoid coil has a rectangular cross section.

13. The method of claim 10, further comprising positioning a second biasing magnet adjacent to the first dynamically controlled solenoid coil.

14. The method of claim 13, wherein the first biasing magnet and the second biasing magnet are magnetically aligned in a same magnetic polar direction.

15. The method of claim 14, wherein the first biasing magnet and the second biasing magnet are aligned with opposite magnetic polarity.

16. The method of claim 10, further comprising positioning a second dynamically controlled solenoid coil adjacent to the first biasing magnet, wherein the second dynamically controlled solenoid coil is configured to generate a second magnetic field.

17. The method of claim 16, wherein a first magnetic pole of the first biasing magnet is directly adjacent to the first dynamically controlled solenoid coil, and a second magnetic pole of the first biasing magnet is directly adjacent to the second dynamically controlled solenoid coil.

18. The method of claim 16, further comprising:
positioning a second biasing magnet adjacent to the first dynamically controlled solenoid coil; and
positioning a third biasing magnet adjacent to the second dynamically controlled solenoid coil.

19. An apparatus comprising:
a first dynamically controlled solenoid coil configured to generate a first magnetic field;
a second dynamically controlled solenoid coil configured to generate a second magnetic field, wherein the second dynamically controlled solenoid coil is positioned parallel to the first dynamically controlled solenoid coil; and
coil driver circuitry configured to drive data signals in the first dynamically controlled solenoid coil and the second dynamically controlled solenoid coil in time with a speed of movement of the apparatus, wherein the first magnetic field and the second magnetic field combine to create a more even magnetic field;
wherein the apparatus is configured to dynamically generate magnetic information patterns using the data signals.

20. The apparatus of claim 19, further comprising a third dynamically controlled solenoid coil configured to generate a third magnetic field, wherein the third dynamically controlled solenoid coil is positioned parallel to the second dynamically controlled solenoid coil such that the first magnetic field, the second magnetic field, and the third magnetic field combine to create the more even magnetic field.

* * * * *